United States Patent
Clarke et al.

(10) Patent No.: US 10,405,210 B2
(45) Date of Patent: Sep. 3, 2019

(54) SYSTEMS AND METHODS FOR AUTOMATICALLY CONFIGURING FREQUENCIES OF RADIO COMMUNICATION DEVICES

(71) Applicant: Common Networks, Inc., San Francisco, CA (US)

(72) Inventors: Ralston Clarke, San Francisco, CA (US); Brian Emmanuel, San Francisco, CA (US); Mark Jen, San Francisco, CA (US); Zachary Brock, San Francisco, CA (US)

(73) Assignee: Common Networks, Inc., San Francisco, CA (US)

( * ) Notice: Subject to any disclaimer, the term of this patent is extended or adjusted under 35 U.S.C. 154(b) by 0 days.

(21) Appl. No.: 16/248,619

(22) Filed: Jan. 15, 2019

(65) Prior Publication Data

US 2019/0223029 A1    Jul. 18, 2019

Related U.S. Application Data

(60) Provisional application No. 62/617,426, filed on Jan. 15, 2018.

(51) Int. Cl.
  *H04W 24/02* (2009.01)
  *H04W 40/02* (2009.01)
  (Continued)

(52) U.S. Cl.
  CPC ........... *H04W 24/02* (2013.01); *H04W 28/16* (2013.01); *H04W 40/02* (2013.01);
  (Continued)

(58) Field of Classification Search
  CPC . H04W 28/00; H04W 28/0236; H04W 28/16; H04W 24/02; H04W 40/02; H04W 84/18; H04W 16/00; H04W 16/18; H04W 16/02; H04W 16/10; H04W 16/12; H04W 72/00; H04W 72/04; H04W 72/0453; H04W 72/06; H04W 72/08; H04W 72/082; H04W 72/085; H04L 5/0058;
  (Continued)

(56) References Cited

U.S. PATENT DOCUMENTS

| | | |
|---|---|---|
| 5,940,372 A | 8/1999 | Bertin et al. |
| 6,604,146 B1 | 8/2003 | Rempe et al. |

(Continued)

FOREIGN PATENT DOCUMENTS

| | | |
|---|---|---|
| CN | 102523162 B | 2/2015 |
| WO | 2016111837 | 7/2016 |

*Primary Examiner* — Warner Wong
(74) *Attorney, Agent, or Firm* — Jeffrey Schox

(57) ABSTRACT

Systems and methods for allocating frequency channels across a radiofrequency (RF) mesh network, including identifying pairs of radio groups having a propensity for interference; allocating frequency channels to each of the plurality of radio groups; and deploying the allocated frequency channels to the plurality of radio groups, using a central routing server including an automated frequency planning module that executes an RF allocation algorithm, wherein the RF allocation algorithm determines the frequency channel to assign to each radio group and deploys the determined frequency channel to each radio group of the plurality of radio groups.

18 Claims, 5 Drawing Sheets

(51) Int. Cl.
*H04W 72/04* (2009.01)
*H04W 28/16* (2009.01)
*H04W 84/18* (2009.01)
*H04L 5/00* (2006.01)

(52) U.S. Cl.
CPC ....... *H04W 72/0453* (2013.01); *H04L 5/0062* (2013.01); *H04L 5/0069* (2013.01); *H04W 84/18* (2013.01)

(58) Field of Classification Search
CPC ................ H04L 5/0062; H04L 5/0061; H04L 2012/5631; H04L 47/6265; H04L 47/76; H04L 47/78; H04L 47/781; H04L 47/788
See application file for complete search history.

(56) References Cited

U.S. PATENT DOCUMENTS

| | | | | |
|---|---|---|---|---|
| 7,106,707 B1* | 9/2006 | Strutt | .................. | H04W 72/082 370/329 |
| 7,945,658 B1* | 5/2011 | Nucci | .................. | H04L 41/065 370/238 |
| 2003/0137970 A1* | 7/2003 | Odman | .................. | H04L 29/06 370/350 |
| 2003/0156549 A1 | 8/2003 | Binder et al. | | |
| 2004/0143428 A1 | 7/2004 | Rappaport et al. | | |
| 2005/0068930 A1* | 3/2005 | Choi | .................. | H04B 1/7163 370/343 |
| 2006/0198295 A1* | 9/2006 | Georg Gerlach | ..... | H04L 5/0048 370/208 |
| 2006/0274663 A1* | 12/2006 | Brethereau | ........... | H04L 41/069 370/247 |
| 2008/0219185 A1* | 9/2008 | Zou | .................. | H04L 45/18 370/254 |
| 2009/0011770 A1* | 1/2009 | Jung | .................. | H04L 5/0037 455/452.1 |
| 2009/0285124 A1 | 11/2009 | Aguirre et al. | | |
| 2012/0243431 A1* | 9/2012 | Chen | .................. | H04W 72/0406 370/252 |
| 2012/0302273 A1* | 11/2012 | Lin | .................. | H04W 16/14 455/509 |
| 2012/0307663 A1 | 12/2012 | Kwak | | |
| 2013/0059583 A1* | 3/2013 | Van Phan | ............. | H04W 72/04 455/435.1 |
| 2013/0223353 A1* | 8/2013 | Liu | .................. | H04W 76/14 370/329 |
| 2013/0272196 A1* | 10/2013 | Li | .................. | H04W 72/044 370/328 |
| 2014/0160925 A1 | 6/2014 | Xu et al. | | |
| 2014/0185454 A1 | 7/2014 | Bellur et al. | | |
| 2015/0016356 A1* | 1/2015 | Yie | .................. | H04W 76/14 370/329 |
| 2015/0223257 A1* | 8/2015 | Wilhelmsson | ...... | H04W 72/082 455/452.1 |
| 2015/0230257 A1* | 8/2015 | Hagerman | ............ | G01S 5/0009 455/456.5 |
| 2016/0014613 A1 | 1/2016 | Ponnampalam et al. | | |
| 2016/0037396 A1* | 2/2016 | Lee | .................. | H04W 36/0055 370/329 |
| 2016/0100412 A1* | 4/2016 | Shin | .................. | H04W 72/082 370/336 |
| 2016/0134468 A1 | 5/2016 | Hui et al. | | |
| 2016/0142252 A1 | 5/2016 | Garg et al. | | |
| 2016/0252355 A1 | 9/2016 | Mays et al. | | |
| 2016/0366096 A1 | 12/2016 | Gilde et al. | | |
| 2017/0142086 A1 | 5/2017 | Chen et al. | | |
| 2017/0353958 A1* | 12/2017 | Long | .................. | H04W 16/14 |
| 2018/0063851 A1* | 3/2018 | Abraham | ............. | H04W 72/10 |
| 2018/0176818 A1* | 6/2018 | Parron | ............. | H04W 28/0284 |

* cited by examiner

SYSTEMS AND METHODS FOR AUTOMATICALLY CONFIGURING FREQUENCIES OF RADIO COMMUNICATION DEVICES

CROSS REFERENCE TO RELATED APPLICATIONS

This application claims the benefit of U.S. Provisional Application No. 62/617,426, filed 15 Jan. 2018, which is incorporated herein in its entirety by this reference.

TECHNICAL FIELD

The inventions of the present application relate generally to communications routing and radio networking fields, and more specifically to new and useful systems and methods for configuring frequencies of a network of radios in the communications routing and radio network fields.

BACKGROUND

Wireless data transmission in the context of telecommunications and computer networking involves the apportionment of finite spectrum bandwidth resources. Various conventional methods and protocols for apportioning the available spectrum exist, including time division and frequency division multiplexing of signals transmitted over wireless networks. Densely deployed radiofrequency (RF) transmission networks that utilize frequency division typically require the reuse of frequency channels; however, if allocation of channels is performed sub-optimally, the network quality degrades significantly. In particular, mesh network topologies present challenges to frequency channel reuse and allocation that conventional methodologies do not adequately address.

Thus, there is a need in the communications routing and computer networking field to create new and useful systems and methods for configuring frequencies of a network of radios. This invention provides such new and useful systems and methods.

DESCRIPTION OF THE PREFERRED EMBODIMENTS

The following description of the embodiments of the present application are not intended to limit the invention to the disclosed embodiments, but rather to enable any person skilled in the art to make and use the inventions described herein.

1. Overview

Radio frequency planning for radios in a large community (e.g., hundreds or thousands) of networked radio nodes involves several complex considerations. Specifically, in the circumstance of a large community of networked radios that include dense population segments of many radios closely positioned to each other and defining overlapping radiation patterns, the potential for radio interference and actualized radio interference between neighboring radios (e.g., connected in radio groups) is increased. That is, radios or radio groups operating or communicating on different frequencies, when closely located to each other tend to cause disturbances and/or interferences that reduce the quality of radio communication links.

Additionally, in some circumstances, a number of useable and/or available radio frequency channels that a large community of networked radios may use to communicate may be limited relative to the number of radios and/or radio groups in the community. For instance, in the case of hundreds or thousands of radios in a community of radios, there may be a very limited number of channels (e.g., 10-11 frequency channels) on which disparate radio groups in the community of radios may use to communicate without interference from other radios within the community as well as other radio transmitters and radio receivers operating outside of the community (e.g., generating background radio signals and/or interference).

The embodiments of the present invention, however, provide systems and methods that function to allocate a limited number of frequency channels to groups of radios in a large community of radios while minimizing interferences between the groups of radios.

Figure 1:
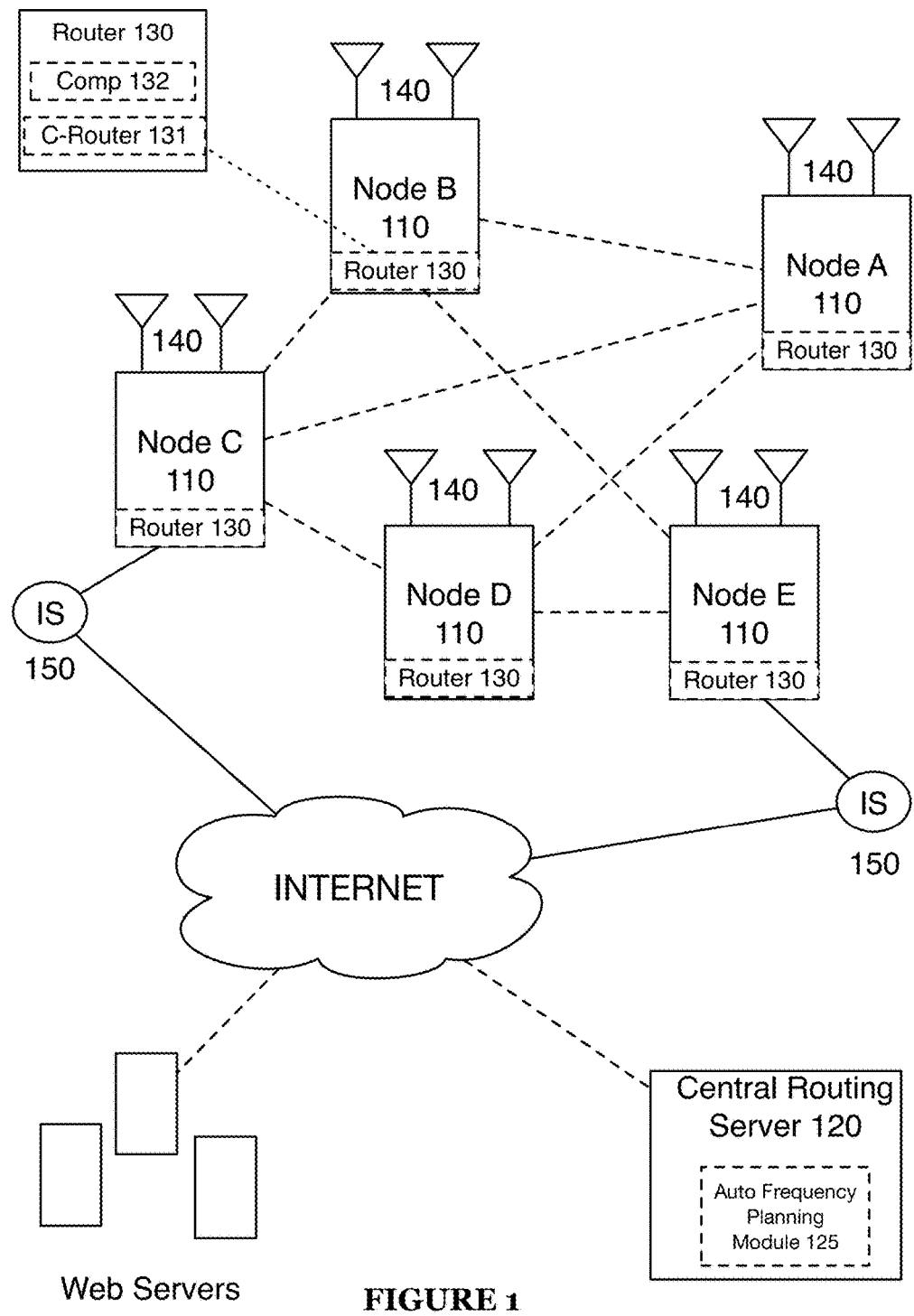
FIG. 1 illustrates a schematic representation of a system 100 for networking and routing radio communications in accordance with embodiments of the present application.

As shown in FIG. 1, a system 100 for configuring the frequencies of a plurality of radios in a network preferably includes a plurality of nodes 110, a central routing server 120 that includes an automated frequency planning module 125, a plurality of routers 130, a plurality of radios 140, and one or more Internet sources 150. The system 100 preferably functions to enable wireless Internet communications between disparate homes (or nodes) using radio frequency-based communications with improved quality of service (e.g., connection quality, QoS, etc.). The system 100 can optionally include elements (e.g., the entire system 100, elements thereof, etc.) such as described in U.S. application Ser. No. 15/937,707, filed 27 Mar. 2018 and titled "Systems and Methods for Networking and Wirelessly Routing Communications", which is hereby incorporated in its entirety by this reference. However, the system 100 can additionally or alternatively include any other suitable components with any other suitable function in relation to configuring frequencies of a network of radios.

Figure 2:
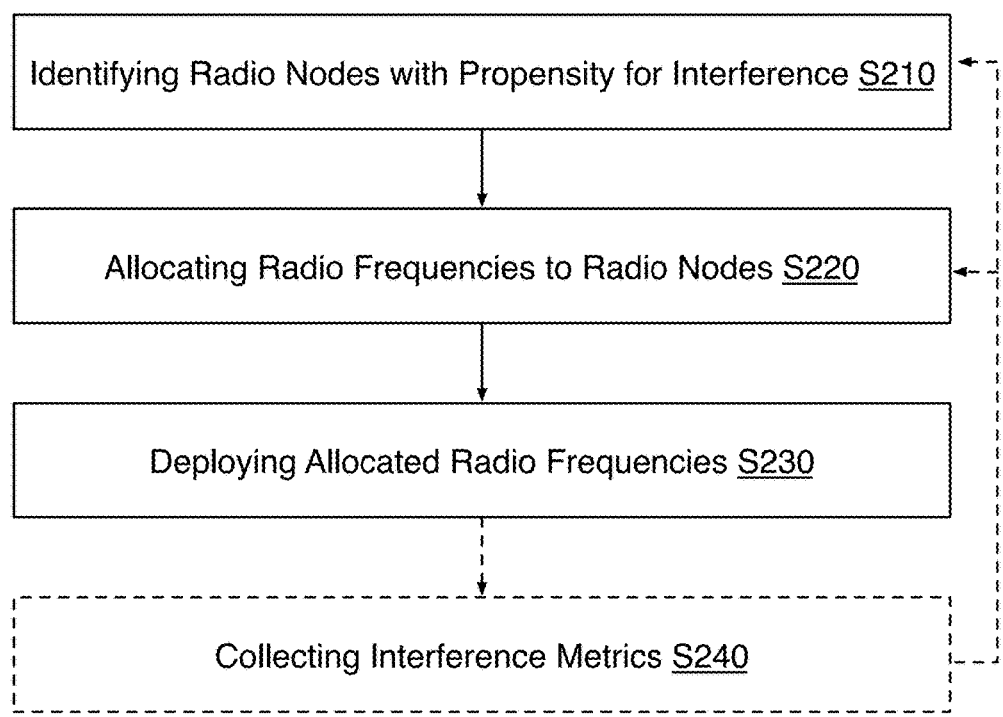
FIG. 2 illustrates a flowchart of a method 200 for generating radio installation and/or radio configuration parameters in accordance with embodiments of the present application.

As shown in FIG. 2, a method 200 for configuring frequencies of a network of radios preferably includes identifying radio nodes having a propensity for interference S210, allocating radio frequencies to the one or more radio nodes S220, and deploying the allocated radio frequencies in a network of radio groups S230, and optionally includes collecting interference metrics S240. The method 200 preferably functions to enable wireless Internet communications between disparate homes (or nodes) using radio frequency-based communications with improved quality of service (e.g., connection quality, QoS, etc.). The method 200 is preferably performed using a system analogous to the system 100, but can additionally or alternatively be performed using any other suitable system(s). The method 200 can additionally or alternatively include any other suitable sub-blocks or processes with any other suitable function in relation to configuring frequencies of a network of radios.

2. Benefits

Variants of the technology can afford various benefits and/or advantages over conventional systems and methods for configuring communication frequencies of a network of radios.

First, variants of the technology can provide practical applications of algorithmic optimization techniques in the context of ad-hoc RF networks. For example, such variants can provide radio-based telecommunications networks (e.g., ad-hoc networks, mesh networks, etc.) in difficult-to-service areas with a high quality of service (e.g., equivalent to service quality in easy-to-service areas, equivalent to or exceeding conventional ISP service quality using conventional network construction methodologies such as cellular or wired networks, etc.) by optimizing frequency channel assignment across the wireless network connections.

Second, variants of the technology can provide technical solutions necessarily rooted in computer technology (e.g., utilizing computational techniques to determine potential RF interference from non-generic location, beam shape, heading, and/or transmission datasets collected at deployed radio nodes, etc.) to overcome issues specifically arising with computer technology (e.g., issues surrounding how to leverage finite wireless spectrum to perform network traffic management, and/or to automatically allocate frequency channels among a plurality of telecommunication nodes utilizing RF bandwidth for information transfer, etc.).

Third, the technology can improve the technical fields of at least radiofrequency telecommunications, wireless Internet routing, and interference mitigation in ad-hoc wireless networks. The technology can continuously and/or periodically collect and utilize non-generic sensor data (e.g., location sensor data, RF transmission quality data, antenna performance data, etc.) to provide real-time or non-real-time frequency allocation based on interference propensity and/or measurement of interference characteristics (e.g., channel quality of service, packet loss rates, etc.) Further, the technology can take advantage of the non-generic sensor data to better improve the understanding of correlations between such data and RF mesh network performance, leading to an increased understanding of interference-related variables affecting RF mesh network construction.

Fourth, variants of the technology can automatically perform actions that manipulate physical systems (e.g., to enhance the performance of such physical systems). For example, such actions can include adjusting the physical orientation of one or more directional radio antennas to improve the performance of a network (e.g., a mesh network) of such radios, by reducing the propensity for interference or actual interference between two or more pairs of communicating radio links.

The technology can, however, provide any other suitable benefit(s) in the context of configuring the frequencies of a plurality of networked radios.

3. System

As shown in FIG. 1, a system 100 for networking and routing Internet communications between a plurality of nodes is illustrated. The system 100 includes a plurality of nodes 110, a central routing server 120 that includes an automated frequency planning module 125, a plurality of routers 130, a plurality of radios 140, and one or more Internet sources 150. The system 100 functions to enable wireless Internet communications between disparate homes (or nodes) using radio frequency-based communications.

In some embodiments, each of the plurality of nodes no is a home, building, or other structure that is disparate and/or geographically remote from another structure forming one of the plurality of nodes no. In some embodiments, each of the homes forming a node may not be geographically remote from another structure (e.g., townhomes, multi-family units, multi-tenant units, etc.), but still may be distinct in terms of the radio-based communication installed at the location of the structure. For instance, a group of the plurality of homes may represent a group of townhomes that are generally connected to one another but each of the townhomes in the group may be owned or managed by a disparate entity and similarly, wherein each townhome may maintain its own radio-based communication system (or alternatively, may share a communication system with one or more other connected townhomes of the group, and/or with any other suitable homes). Each node may be geographically remote in terms of distance between each other. In this sense, the nodes may be spaced apart in the range of a few feet to possibly a few miles; however, in many instances, the nodes may be 5 feet to 300 feet away from each other, which is typically the distance of homes in a specific neighborhood. Thus, the plurality of nodes 110 may represent all of the homes in a specific neighborhood, which are connected via the system 100 and forming a geographically defined mesh network or the like.

Additionally, or alternatively, the plurality of nodes 110 may be a combination of different types of entities requiring and/or desiring electronic communications (e.g., Internet communications) to be routed between them. For instance, the plurality of nodes 110 may be include homes, buildings, vehicles, electronic devices, computing devices, and the like in a specific geographic region. This combination of devices may be connected via the system 100 to network and route Internet communications between them. Effectively, the plurality of nodes 110, preferably, form a mesh network with the ability to network with one or more neighboring nodes within the mesh to route or pass communications from an initiating node to a destination node and possibly, onward to a larger communication network (e.g., WAN, Internet, etc.).

Generally, the plurality of nodes 110 are preferably configured to communicate with each other wirelessly using radio frequency communications. However, it shall be noted that the plurality of nodes may implement a combination of communication schemes or systems to effectively communicate and/or route communication packets between them including any short-range communication system (e.g., Bluetooth) and/or long-range communication systems (e.g., long-range radio chips, Internet, etc.), and/or can additionally or alternatively communicate in any other suitable manner (or not communicate).

The central routing server 120 can function as a central authority for monitoring the network formed by a plurality of nodes 110 and for controlling the operation of each of the plurality of routers 130 and each of the plurality of radios 140 at each of the plurality of nodes. For example, the central routing server 120 can function to determine and/or implement one or more routing tables associated with system operation (e.g., as described in U.S. application Ser. No. 15/937,707, filed 27 Mar. 2018 and titled "Systems and Methods for Networking and Wirelessly Routing Communications", which is hereby incorporated in its entirety by this reference), and can additionally or alternatively function to determine and/or implement one or more frequency plans associated with system operation (e.g., as described below in relation to the automated frequency planning module 125 and/or the method 200 and portions or variations thereof).

Additionally, or alternatively, the central routing server 120 may be hosted on a cloud-based system or distributed computing system. Additionally, or alternatively, the central routing server 120 may include several servers operably connected with each other and operably connected to the network formed by the plurality of nodes 110. Preferably, the central routing server 120 is geographically remote from the plurality of nodes 110; however, there may be one or more centrally controlled servers at or near one or more of the plurality of nodes 110 and usually, near or at an Internet source 150 for purposes of encrypting and decrypting data being transmitted between each of the plurality of nodes.

The central routing server preferably includes an automated frequency planning module 125, which functions to evaluate a network of radio nodes that defines a network of radio groups, and allocate frequencies to the network of radio groups that makes up the network of radio nodes in a manner that minimizes or reduces interference in the network of radios. In particular, the automated frequency planning module (e.g., automatic frequency planner, automatic frequency planning module, etc.) preferably executes and/or implements all or a portion of the method 200 described herein (e.g., an RF allocation algorithm as described, deployment and iteration of such an allocation, etc.); however, the automated frequency planning module 125 can additionally or alternatively perform any suitable actions in relation to frequency allocation among the plurality of radio groups forming the network.

The central routing server 120 also functions to collect data from each of the plurality of nodes 110. Specifically, the central routing server 120 may be in operable communication with each of the plurality of routers 130 and each of the plurality of radios 140. The plurality of routers 130 and radios 140 may periodically record data and/generate data which the routers 130 and the radios 140 transmit (e.g., via the Internet or the like) back to the central routing server 120. The recorded and/or generated data may include any data regarding an attribute of the communications being transmitted between the plurality of nodes no and, may include, but is not limited to, data regarding operational attributes of each of the nodes (e.g., operations of each router and/or set of antennas at a node).

The central routing server 120 may use the communications and operational data collected from the routers 130 and/or radios 140 to determine routing paths for current and/or future communications. Specifically, the central routing server 120 may generate one or more routing tables that include communications routing paths specific to each node of the plurality of nodes 100 that indicates the specific radio links or chain of links that a communication from a node will travel to arrive at its destination. For instance, in a mesh network formed by a plurality of nodes that includes nodes A-E and an Internet source (e.g., destination of communications from nodes A-E), the routing table generated by the central routing server 120 may provide that a communication initiated from node A travels the path A to C to E to Internet source and that a communication initiated at node D travels the path D to A to E to Internet source. Thus, the routing table defines a communications routing path for each of the nodes for transmitting a communication initiating from a specific node to the Internet source and vice versa (e.g., from the Internet source to a specific node).

The routing tables generated by the central routing server 120 may be updated periodically (e.g., every few 2-10 milliseconds, every 10 minutes, daily, etc.). The routing tables may be updated as frequently as new data is collected from the nodes, such that a significant data update from the nodes may trigger the central routing server 120 to automatically update the routing tables and transmit the updated routing tables to the nodes, especially when it is recognized by the central routing server 120 that one or more nodes may not be operational or functioning properly or the like (e.g., a node is down).

Once the routing tables are generated by the central routing server 120, the central routing server 120 may transmit the generated routing tables to one or more nodes in a networked set of nodes. The nodes receiving the routing tables may then propagate the routing tables to each of its neighboring nodes until all or nearly all of the nodes in the networked set of nodes has the most up-to-date routing tables. Additionally, or alternatively, each of the nodes in the networked set of nodes may continually or periodically ping neighboring nodes to determine whether there are new routing tables available and, in that way, the routing tables may be pulled through the system by the requesting nodes rather than pushed through the system by the receiving nodes.

Additionally, the central routing server 120 monitors each of the radio links between connected nodes in a networked set of nodes. Specifically, the central routing server 120 may use the data collected from each of the nodes via the routers 130 and radios 140 to identify attributes of the radio links between connected nodes. For instance, the central routing server 120 is able to monitor and/or identify a signal strength of a radio link, the utilization of a radio link, the capacity of a radio link, the bandwidth of a radio link, the throughput of a radio link, disconnectivity of a radio link, and the like. Based on the monitoring information, the central routing server 120 is able to determine routing instructions and routing tables. For instance, if the central routing server 120 identifies that a node in a networked set of nodes is malfunctioning and thereby cannot pass communications between nodes, the central routing server 120 may generate a new routing table that avoids making the malfunctioning node a transmitting node (e.g., an intermediary node transmitting communications between an initiating node and a destination node).

Each router 130 (or a subset thereof) of the system preferably includes a combination of an intra-node communications router 131 (e.g., internal structure communications router; Wi-Fi router, transmitter, and/or receiver; wired Ethernet router; etc.) and a computing device 132 (e.g., computer). The communications router 131 is preferably connected to one or more user devices or other routers within a node and functions to route communications between each of the user devices and/or routers and the Internet. The computing device 132 preferably functions to operate communications processing and user (e.g., resident) routing software, such as software that, when executed by the computing device 132, allows the computing device 132 to encrypt out-going communications initiated from the node and decrypt incoming communications received by the node. The computing device 132 preferably functions to generate operational data (e.g., that is communicated to the central routing server 120). Additionally or alternatively, the computing device 132 preferably functions to execute routing functionality (e.g., all routing functionality) for a specific node, optionally including identifying and/or requesting new routing tables and the like.

Each node of the plurality of nodes 110 (or a subset thereof) preferably includes one or more radios 140. Each radio 140 can include one or more radio elements (e.g., transmitters, receivers, antennae, etc.), each preferably including a single transceiver and antenna but alternatively including any suitable radio elements. Each radio 140 is preferably configured to communicate with one or more other radios 140 of the system 100 (e.g., is communicatively coupled to the one or more other radios via a radio communication link), more preferably operating on a single frequency channel (or set of channels) at a given time (e.g., during operation under a frequency plan that specified the channel(s) in association with the radio 140).

The system 100 (e.g., the radios 140 of the system) preferably defines a set of radio groups, wherein each plurality of radios 140 (preferably 2 radios, but alternatively more than 2 radios, such as 3, 4, 5, 6-10, 10-20, or 20-50 radios, etc.) that are configured to communicate together via one or more radio-based inter-node communication methods (e.g., are communicatively coupled to each other via radio communication links) define a radio group of the set. Each radio 140 is preferably associated with a radio group of the set (preferably associated with only one radio group of the set, but alternatively associated with more than one). For each radio group, the radios 140 of group preferably operate on the same frequency channel (e.g., as specified by the frequency plan). Preferably, for any radio group, each radio of the radio group is associated with (e.g., located at, included in, etc.) a different node, and/or for any node, each radio of the node is included in a different radio group. However, multiple radios of a group can alternatively be associated with the same node, and/or multiple radios of a node can alternatively be included in the same group.

Each radio (or a portion thereof, such as one or more of the antennae) is preferably positioned at an external location of the node (e.g., on the exterior of a building associated with the node, outside and near the building, atop a roof of a building associated with the node, etc.), but can additionally or alternatively be positioned at an internal location (e.g., within a building associated with the node) and/or in any other suitable location. For instance, if the node is a home, the radios (e.g., antennae) can be positioned external to an interior of the home, preferably positioned on the home and/or at a position adjacent or immediately next to the home. Each node may include one or more antennae (e.g., 1-4 or 1-n antennae) that may be positioned in various directions to establish multiple connections with one or more antennae of disparate nodes. Each of the radios at a specific node may be used to establish active and potential links with other radios (e.g., of neighboring nodes, of nearby nodes, etc.). An active link between radios of two disparate nodes may representative a communications link determined by a routing table generated by the central routing server 120. A potential link between radios of two disparate nodes may represent communication links that are not currently in use but may become active links depending on a new routing table. The radio groups can be defined, for example, based on the active links, potential links, and/or any other suitable communication links between the radios 140.

The radio(s) 140 of a node are preferably communicatively coupled, by one or more intra-node communication mechanisms, to each other and/or to one or more other electronic devices of (and/or associated with) the node, such as the router 130, user devices (e.g., smart phone, tablet, computer, smart TV, etc.), and/or any other suitable devices. Preferably, each node is defined as including all of a set of devices that are communicatively coupled by the intra-node communication mechanism(s), but alternatively radio(s) 140 of a node can be communicatively coupled to devices of other nodes by an intra-node communication mechanism (e.g., facilitated by the router(s) 130 of the node). The intra-node communication mechanisms can include wired connections (e.g., Ethernet connections, coaxial cable connections, fiber optic connections, etc.), wireless connections (e.g., implemented using protocols such as Wi-Fi, Bluetooth, Thread, ZigBee, Z-Wave, etc.), and/or any other suitable connections. The intra-node communication mechanisms are preferably distinct from the inter-node communication mechanisms (e.g., do not include the radio links implemented by the radios 140, but can alternatively include the inter-node communication mechanisms.

In one embodiment, each radio 140 of a node can be connected via a wired connection mechanism (e.g., wired Ethernet connection) to the router 130 of that node, and various other electronic devices (e.g., user devices, other routers and/or access points, etc.) of the node can be connected to the router 130 (e.g., via wired connections such as wired Ethernet, via wireless connections such as Wi-Fi, etc.). In a variation of this embodiment (e.g., wherein the node is associated with multiple entities, such as user accounts associated with different residential units of a multi-unit building), the node includes multiple routers 130 (e.g., one for each residential unit), each connected to the radio(s) 140 of the node. However, the radios 140 and/or other devices of a node can additionally or alternatively be connected in any other suitable manner.

The Internet sources 150 include media, such as fiber optic cables that are generally fixed in position relatively to a networked set of nodes. Additionally, or alternatively, the Internet sources 150 may include a wireless link (e.g., gigabit+wireless link) to a datacenter or other intermediary for a backhaul connection to the Internet. The Internet sources 150 may include a plurality of Internet access points positioned proximate to one or more nodes of the networked set of nodes. Each of the plurality of Internet access points may be hardwire connected to the one or more nodes. At each of the Internet access points may be one or more centrally-controlled servers or computers that are able to decrypt communications and/or data received from a node prior to sending the communications through the fiber optic cables to an Internet server. Additionally, the one or more centrally controlled servers or computers may encrypt communications and/or data from the Internet server prior to forwarding the communication to a destination node. In this way, requests and data communications from a node in a networked set of nodes is kept secure and private from other nodes (e.g., transmitting nodes) in the networked set of nodes.

In a specific example, the system 100 includes a plurality of nodes, wherein each node defines a geographic position and includes a radio (e.g., associated with the geographic position), and an antenna communicatively coupled to the radio and defining a broadcast heading and beam shape. The plurality of nodes of this example are communicatively connected (e.g., mutually interconnected) in a network over a plurality of wireless links, wherein each of the plurality of wireless links is between a first radio of a first node and a second radio of a second node that cooperatively define a radio group such that the plurality of nodes defines a plurality of radio groups. In this example, each radio group of the plurality of radio groups is associated with a frequency channel over which a corresponding wireless link of the plurality of wireless links is made. This specific example further includes a central routing server including an automated frequency planning module that executes an RF allocation algorithm (e.g., as described below in relation to the method 200), wherein the RF allocation algorithm determines (e.g., based on input data defining the properties of the nodes and groups of the network) the frequency channel to assign to each radio group of the plurality of radio groups based on a computed interference propensity metric associated with pairs of radio groups, wherein the computed interference propensity metric is based on at least one of the geographic position, the broadcast heading of the antenna, and the beam shape of the antenna of each node of the pairs of radio groups, and deploys the determined frequency channel to each radio group of the plurality of radio groups. The computed interference propensity metric can include a quantification of any of the sources of potential interference as described above (e.g., an area or volume of geospatial overlap between beams, an angular difference between headings of radio groups, etc.).

However, the system 100 can additionally or alternatively include any other suitable elements, having any suitable functionalities, in any other suitable arrangement.

4. Method

As shown in FIG. 2, a method 200 for automatically generating radio frequency parameters and/or radio configurations includes identifying radio nodes having a propensity for interference S210, allocating radio frequencies to the one or more radio nodes S220, deploying the allocated radio frequencies in a network of radio groups S230, and collecting interference metrics S240.

The method 200 is preferably implemented by and/or in conjunction with a system analogous to the system 100 as described above; in particular, the method 200 and/or portions thereof is preferably implemented and/or executed by an automatic frequency planning module analogous to the automatic frequency planning module 125 described above. However the method 200 can additionally or alternatively be implemented by and/or in conjunction with any other suitable systems or system components.

Block S210 preferably includes identifying radio nodes having a propensity for interference. Block S210 functions to identify radio groups (e.g., two or more radios communicating over the same frequency channel) that may potentially be in interference with other such groups based on configurations of the radio nodes. For instance, in some embodiments, a pairing of radio nodes operating on different radio frequencies may be in potential interference based on overlapping radio links that beam frequencies across each other. Thus, while a first group of radio nodes in the pairing may operate a radio frequency different than the second group of radio nodes in the pairing, interference may be generated based on a closeness of the radio frequency channels and the overlapping of radio communications between the first and second group of radio nodes.

Figure 3:
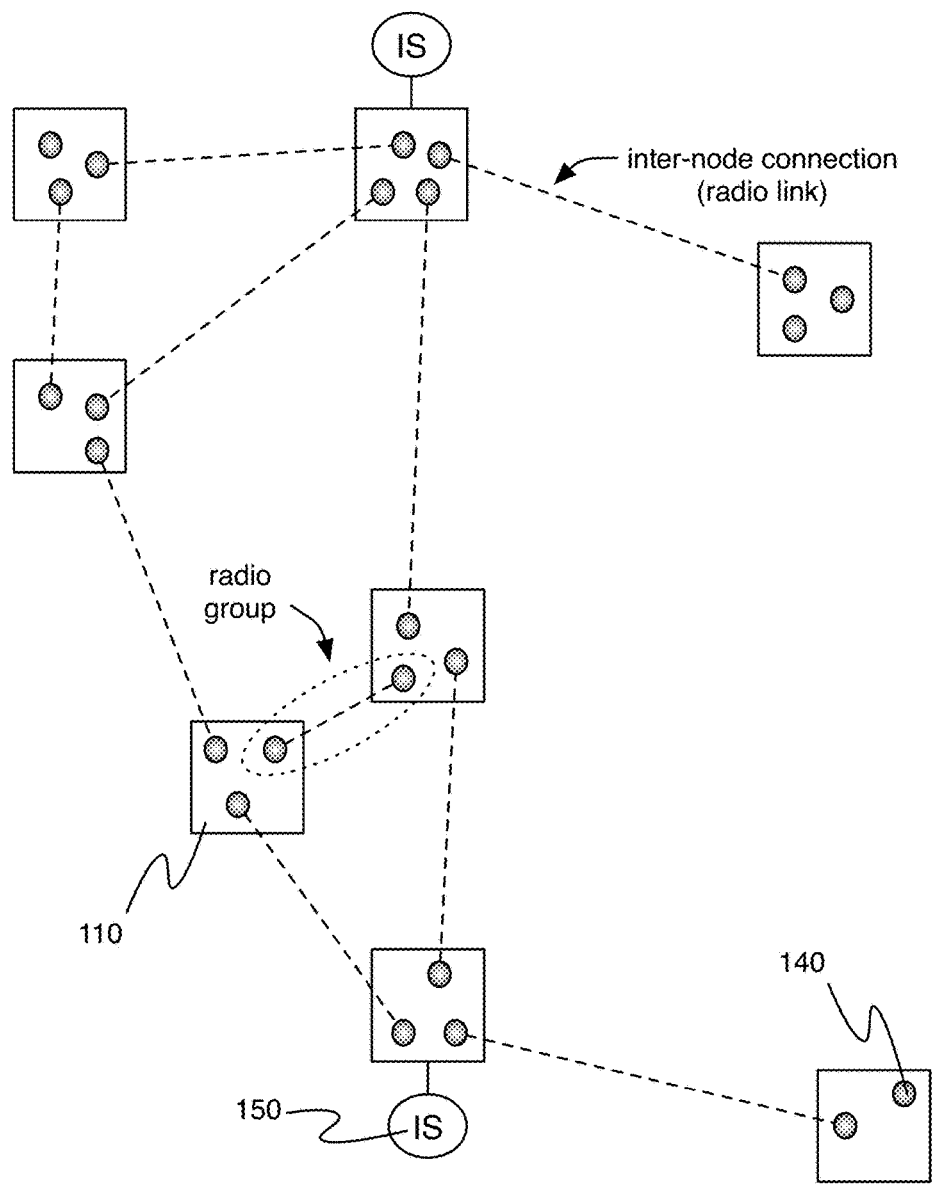
FIG. 3 illustrates a schematic representation of a mapping of radio nodes in accordance with embodiments of the present application.

Accordingly, S210 preferably includes identifying radio groups which include a collective of radios sharing a common radio frequency (in a specified or predetermined geographic location, such as a region, zone, neighborhood, etc.), as shown by way of example in FIG. 3. The collective of radios defining a radio group may typically be networked together for the purposes of routing communications (e.g., routing Internet communications or the like). Thus, a radio group preferably includes a group of radios that are controlled to communicate using a same radio frequency (e.g., frequency band, frequency channel, etc.).

Figure 4:
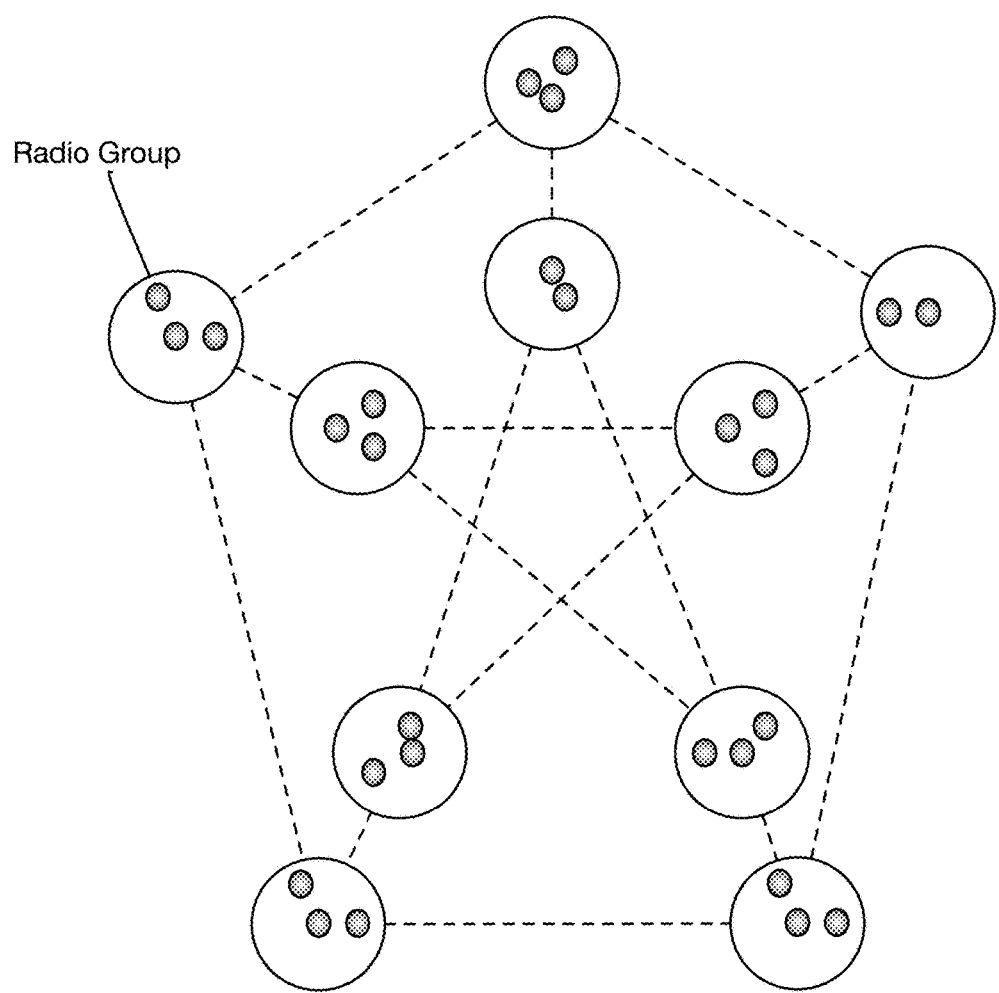
FIG. 4 illustrates a schematic representation of a mapping of radio nodes with interference edge connections in accordance with embodiments of the present application.

Across a large geographic area (e.g., a suburban area, a metro area, etc.), S210 may identify some or all radio groups operating within the large geographic area. Subsequently, once radio groups operating in a geographic area are identified, S210 may additionally function to generate a mapping of radio groups having a propensity for interference. Specifically, S210 may identify an interference link or a graphical edge between pairings of radio groups that interfere or may potentially interfere with each other based on configurations of the radios within each respective radio groups of the pairing, as shown by way of example in FIG. 4.

In a first implementation, S210 may function to identify a mapping of radio groups having propensities for radio frequency interferences based on radio headings and geometric RF intersections of the mapped radio groups. In this first implementation, S210 may function to approximate radio frequency beam dimensions or beamwidths for each radio in the one or more mapped radio groups. For a typical radio, S210 may approximate a beamwidth based a measure of a three-dimensional volume (e.g., approximately a cone-shaped volume) into which a radio's frequencies may propagate.

Additionally, S210 may function to map the three-dimensional volumes of each of the radios of the mapped radio groups to identify points of intersection between RF beams of radios in a first radio group and beams of radios in a second radio group, for example. It shall be understood that while it is described in one example that RF intersections are identified between two disparate radio groups, RF intersections may be identified between any number of disparate radio groups.

Accordingly, in this first implementation, S210 may function to augment the mapping of the radio groups with edge connections or links between radio groups in which potential RF interferences may be realized based on the determined geometric RF intersections.

In a second implementation, S210 may function to detect or identify an interfering pair of radio groups by identifying radios and/or radio groups that may be collocated or substantially collocated. In the circumstance when two or more radio groups are collocated, it is possible that radio frequency interference may be realized based on RF leakages even if the two or more radios groups have headings oriented away from each other. A radio group or a radio pair may be collocated if or when a pair of radios or a pair of radio groupings are geographically positioned at a same or near a common X-Y coordinate location. That is, in some embodiments, a potentially interfering pair of radios may be side-by-side, adjacent to each other, or otherwise juxtaposed with each other. In some embodiments, a potentially interfering pair of radios may be co-axially (in the Z-direction) collocated on a same mounting pole as well as collocated based on a common X-Y coordinate location.

Accordingly, in this second implementation, S210 may function to augment the mapping of the radio groups with edge connections or links between radio groups in which potential RF interferences may be realized based on geolocation data and/or collocation data of the radio groups.

In a third implementation, S210 may function to detect or identify potentially interfering pairs of radio groups by identifying radios and/or radio groups having a line of sight to other radios and/or radio groups operating different radio frequencies. That is, from a perspective of a subject radio, S220 may function to determine whether it is possible for the subject radio to visually see another radio operating a different radio frequency. Thus, while it is possible that there may be limited or no geometric RF interferences between the beams of the two radios, randomly behaving RF frequency waves and RF leakages may potentially cause realizable interferences between the pair of radios.

Additionally, or alternatively, S210 may function to identify random radio frequency noise that may be detectable by radio groups. For instance, focusing a single radio group, S210 may function to identify interferences being received from other radio frequency channels. An assessment of the interferences may be performed to determine whether the interferences originate from other radio groups or non-radio group sources (e.g., random sources of radio frequency).

Accordingly, in this third implementation, S210 may function to augment the mapping of the radio groups with edge connections or links between radio groups between which potential RF interferences may be realized based on line of sight interference data the radio groups and random RF interference data.

Block S210 preferably determines (e.g., generates) a graph data structure as an output. The graph data structure defines nodes and edges, wherein the edges connect the nodes. Each node represents a radio group, and edges connecting two radio groups represent a propensity for interference between the two radio groups. In some variations, the edges can be weighted by a relative propensity value (e.g., wherein the propensity of interference is mapped onto a numerical scale, wherein the propensity of interference is quantified by an interference value, etc.). Weights can be based on the source of the interference propensity determination (e.g., geometric RF intersection data of the mapped radio groups can be weighed more heavily than geolocation interference data and the line of sight interference data in determining the overall propensity for interference). In alternative variations, the edges can be unweighted (e.g., wherein an edge exists if the propensity for interference exceeds a threshold value, such that the propensity for interference is quantified as a binary value and represented by the presence or absence of an edge between two radio groups, etc.). However, Block S210 can additionally or alternatively generate any suitable output, in any other suitable format, to represent the propensity of interference between a network of radios organized into radio groups.

Block S220 preferably includes allocating radio frequencies to the one or more radio groups. Block S220 functions to implement a radio frequency (RF) allocation algorithm based on a mapping (e.g., a graph data structure) of the potentially interfering radio groups. Preferably, the RF allocation algorithm functions to assign radio frequencies to the potentially interfering radio groups in a manner that minimizes interferences between radio groups having a propensity for interferences (e.g., sharing an edge of the graph data structure). The RF allocation algorithm may additionally function to allocate or assign radio frequencies to the potentially interfering radio groups that minimizes a number of frequency changes or frequency edits required throughout a network of radio groups.

Figure 5:
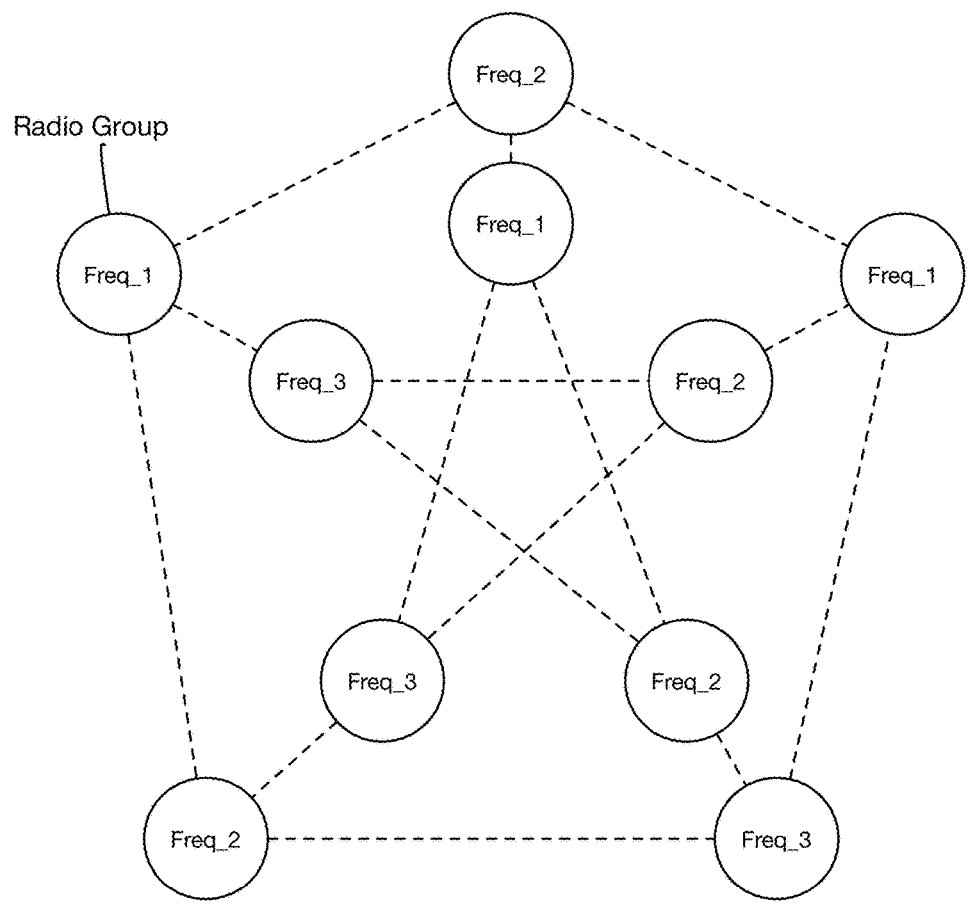
FIG. 5 illustrates a schematic representation of a mapping of radio nodes with interference edge connections with allocations of non-interference frequencies in accordance with embodiments of the present application.

In variations, the RF allocation algorithm comprises a graph coloring technique that functions to allocate radio frequencies across a graph (e.g., as output by Block S210 in one or more variations) of potentially interfering radio groups in a manner so that any two connected radio groups preferably do not share a common radio frequency (e.g., frequency channel). In application, once a mapping of potentially interfering radio groups is defined (as described in S210), S220 may function to color or label the mapping with one or more of a limited set of radio frequencies (e.g., 10 channels, ii channels, 20 channels, etc.) that can be allocated to the radio groups. As shown by way of example in FIG. 5, if the limited set of radio frequencies includes only three radio frequencies, S220 implementing graph coloring (or labeling) may function to apply the three radio frequencies in manner such that no pair of radio groups having edge or link shares a common radio frequency.

In relation to the graph coloring technique, the technique can be generalized to applications in networks of radio groups wherein the number of colors (e.g., number of available channels) is finite. Accordingly, adjacent edges can share the same color in various scenarios (e.g., allocations of frequency channels). The overlapping (e.g., in frequency space, in the time domain, etc.) between pairs of channels can vary across the available spectrum (e.g., between different pairs of channels), and thus adjacent radio groups can share the same color in some cases based on the degree and type of overlap between channels (e.g., wherein particular overlapping channels may interfere minimally and thus be suitable for adjacent radio groups in a graph of the network of radio groups). However, the graph coloring technique can additionally or alternatively be otherwise suitably applied.

In variations, the graph coloring technique can include ordering the radio groups prior to assigning a color or label to each group as described above, wherein the color or label is assigned in the determined order. For example, the order can be determined based on a number of edges connected to each node (radio group) in the graph data structure (e.g., wherein the first color or label is assigned to the node with the most edges connected thereto). In another example, the order can be determined based on a weighted sum of the edges connected to each node (radio group) in the graph data structure (e.g., wherein the weights of each edge can be determined based on the source of the interference propensity data or otherwise suitably based).

In relation to the graph coloring technique, graphical nodes may, in some configurations, have the same number of edges connected thereto (or the same weighted sum of weighted edges) as another graphical node in the graph (i.e., they may be tied). Thus, ties can be broken in various suitable ways in conjunction with the graph coloring technique and/or other ordering methodologies for allocating frequency channels to the network of radio nodes. For example, ties can be broken between two radio groups based on a secondary metric (e.g., wherein the radio group associated with a greater secondary metric value is ordered ahead of another radio group with the same number of edges or weighted sum of weighted edges and a lower secondary metric value). Such secondary metrics can include: a number of downstream data users connected to each radio node of a radio group, a quantification of the essentiality of service associated with a radio node of a radio group (e.g., wherein a node services a first responder entity or emergency entity and is thus associated with a high essentiality value), a volume of network traffic moving through the radio nodes of a radio group, a customer value (e.g., based on money spent, lifetime revenue, etc.) of the downstream customers connected to the radio nodes of a radio group, and any other suitable secondary metrics. In cases wherein a tie remains after comparison of secondary metric values, multiple secondary metric values can be used to break ties (e.g., in any suitable order). However, ties can be otherwise suitably resolved in relation to ordering of radio groups for frequency channel allocation.

In a second implementation, when a mapping of the radio groups having propensities for interferences is large (e.g., one or more radio groups have links exceeding a number of frequencies that can be allocated), S220 may function to implement the RF allocation algorithm in such a manner to minimizes interferences and edits while possibly allowing some radio groups that share a link to have a common frequency, based on secondary considerations (e.g., the relative importance of each radio group to the network based on traffic volume, the number of downstream customers of each radio node in the radio group, etc.).

Specifically, S220 may function to provide as input into an RF allocation algorithm one or more of the geometric RF intersection data of the mapped radio groups, geolocation interference data (e.g., collocation interference data), and line of sight interference data (as described in S210) to generate radio frequency assignments to each radio group within the mapping of radio groups.

In some embodiments, S220 may function to implement the RF allocation algorithm such that the geometric RF intersection data of the mapped radio groups is weighed more heavily than geolocation interference data, and the line of sight interference data. In one example, if a subject radio group shares a first interference edge based on geometric RF intersection with a first radio group and a second interference edge based on ling of sight interference with a second radio group, the RF allocation algorithm may function to allocate RF frequencies to the subject radio group and the first radio group having a greater distance (e.g., Frequency_1 to subject radio group and Frequency_n to first radio group) from each other and hence, a reduced possibility of interferences. Whereas, the RF allocation algorithm may allocate a radio frequency (e.g., Frequency_2) to the second radio group that is close to the frequency channel of the subject group. The RF allocation algorithm may operate in this manner to reduce the possibility of interferences between radio groups having a greater probability of interferences due to the type and/or kind of RF interferences existing within an edge connecting two potentially interfering radio groups.

In variations of S220, provide the mapping data of the radio groups having a propensity for interference as well as the geometric RF intersection data of the mapped radio groups, geolocation interference data (e.g., collocation interference data), and line of sight interference data (as described in S210) of the mapped radio groups as machine learning input into a machine learning model to generate radio frequency assignments to each radio group within the mapping of radio groups. Preferably, the machine learning model includes a machine learning algorithm that has been trained to allocate frequencies to radio nodes in a manner that minimizes RF interferences between radio nodes. However, the model can additionally or alternatively include or be implemented with any suitable paradigm such as an artificial neural network (e.g., a convolutional neural network), Bayesian model, a deterministic model, a stochastic and/or probabilistic model, and any other suitable model (e.g., any suitable machine learning, statistical method, other suitable technique, etc.).

Block S230 preferably includes deploying the allocated radio frequencies in a network of radio groups. Block S230 functions to perform frequency edits of one or more radio groups of a network of radio groups in a manner that minimizes downstream and/or upstream interferences in other segments of the network (e.g., during the deployment, during use, etc.).

In some embodiments, S230 may function to simulate interference responses to the deployment of new frequencies to the network of radio groups (e.g., based on historical traffic data of the network, based on a model of network traffic, based on predicted network traffic, etc.). Accordingly, S230 may function to generate one or more simulations for each possible deployment of the available frequencies. Accordingly, S230 may function to rate or rank each of the one or more simulations based on the amount of interference response resulting from specific deployment.

Additionally, S230 may function to automatically select or enable a selection of the radio frequency deployment scheme or method associated with a scenario having a lowest interference response resulting from the proposed deployment of radio frequencies.

The method can include Block S240, which includes collecting interference metrics. Block S240 functions to measure the interference properties of the network of radio nodes (connected in radio groups) subsequent to frequency allocation (e.g., in accordance with Block S220) and deployment (e.g., in accordance with Block S230). Block S240 can be performed continuously, periodically, asynchronously, and/or with any other suitable temporal characteristics. In variations, Block S240 can generate a set of interference metrics which can be provided to Block S210 as an input for iterative improvement of the interference propensity mapping (e.g., incorporating real data into the estimate of interference propensity, such that the interference propensity also describes actual interference occurrence in cases wherein interference takes place after allocation and deployment).

Optionally, S240, which can include measuring the RF interferences in the radio groups post deployment of a proposed RF allocation for a network, includes collecting RF interference levels between the radio groups of a network and identifying whether the collected RF interference levels of a network implementing the proposed RF allocation has improved over prior RF interference levels of the network without the determined RF allocation (e.g., in one or more variations of Block S220) deployed. In the case that the RF interference levels have not improved, S230 may function to automatically revert the network to a state prior to a deployment of a proposed RF allocation, or automatically re-allocate RF channels based on the measured interference data (e.g., regenerate a graph data structure and re-allocate via a graph coloring technique, as described in relation to one or more variations of Block S220).

In a specific example, the method 200 includes identifying pairs of radio groups having a propensity for interference from among a plurality of radio groups, wherein each radio group includes at least two radios communicatively coupled by an associated wireless link, based on at least one of the geographic position, heading, and beam shape associated with each of the at least two radios of each radio group, and generating an interference propensity mapping based on the propensity for interference of each radio group with each other radio group; allocating frequency channels to each of the plurality of radio groups based on the interference propensity mapping; deploying the allocated frequency channels to the plurality of radio groups; and collecting interference metrics based on actual network traffic among the plurality of radio groups, updating the interference propensity mapping based on the collected interference metrics, and reallocating frequency channels in response to detecting an allocation trigger. The allocation trigger can include a discrete event (e.g., network traffic exceeding a threshold value, a change in network traffic exceeding a threshold value, the addition or subtraction of one or more radios or radio nodes from the network, etc.), a periodic event (e.g., an allocation frequency corresponding to monthly, weekly, daily, hourly, etc. reallocation of frequency channels to account for changing network characteristics), and/or any other suitable event.

The system and methods of the preferred embodiment and variations thereof can be embodied and/or implemented at least in part as a machine configured to receive a computer-readable medium storing computer-readable instructions.

The instructions are preferably executed by computer-executable components preferably integrated with the system 100 and one or more portions of the computer processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various nodes, routing algorithms (e.g., shortest path, fastest-time path, etc.), and the like.

As a person skilled in the art will recognize from the previous detailed description and from the figures and claims, modifications and changes can be made to the preferred embodiments of the invention without departing from the scope of this invention defined in the following claims.

We claim:

1. A system for allocating frequency channels across a radiofrequency (RF) mesh network, comprising:
   a plurality of nodes, wherein each node defines a geographic position and comprises:
      a radio associated with the geographic position, and
      an antenna communicatively coupled to the radio and defining a broadcast heading and beam shape;
   wherein the plurality of nodes are communicatively connected in a network over a plurality of wireless links, wherein each of the plurality of wireless links is between a first radio of a first node and a second radio of a second node that cooperatively define a radio group such that the plurality of nodes defines a plurality of radio groups;
   wherein each radio group of the plurality of radio groups is associated with a frequency channel over which a corresponding wireless link of the plurality of wireless links is made;
   a central routing server comprising an automated frequency planning module that:
      executes an RF allocation algorithm, wherein the RF allocation algorithm determines the frequency channel to assign to each radio group of the plurality of radio groups based on a computed interference propensity metric associated with pairs of radio groups, wherein the computed interference propensity metric is based on at least one of the geographic position, the broadcast heading of the antenna, and the beam shape of the antenna of each node of the pairs of radio groups, and
      deploys the determined frequency channel to each radio group of the plurality of radio groups;
   wherein the RF allocation algorithm comprises a graph coloring technique, and wherein the automated frequency planning module:
      defines a graph of radio groups connected by edges, wherein an edge connects a pair of radio groups based on the computed interference propensity metric associated with the pair;
      orders the plurality of radio groups according to a number of edges connected to each radio group of the graph to generate an ordered list of radio groups; and
      sequentially assigns frequency channels to the ordered list of radio groups.

2. The system of claim 1, wherein the automated frequency planning module orders the plurality of radio groups according to the number of edges and, wherein radio groups have equal numbers of edges connected thereto, such radio groups are ordered based on a secondary metric.

3. The system of claim 2, wherein the secondary metric comprises a number of downstream users connected to the nodes of the radio group, and wherein radio groups having a higher number of downstream users are ordered ahead of radio groups having a lower number of downstream users.

4. The system of claim 2, wherein the secondary metric comprises a historical downlink demand of the nodes of the radio group, and wherein radio groups having a higher historical downlink demand are ordered ahead of radio groups having a lower number of downstream users.

5. The system of claim 1, wherein the edge connects a pair of radio groups based on the computed interference propensity metric exceeding a threshold value.

6. The system of claim 1, wherein each edge is weighted in proportion to the computed interference propensity metric, and wherein the automated frequency planning module orders the plurality of radio groups according to a weighted sum of the number of edges connected to each radio group.

7. The system of claim 1, wherein the RF allocation algorithm comprises a heuristic technique, wherein frequency channels are assigned such that the broadcast headings of the antennas of the nodes in each radio group are within non-overlapping angular sectors.

8. The system of claim 1, wherein the RF allocation algorithm comprises a business logic technique, wherein frequency channels are ordered by quality of service (QoS) and assigned to radio groups based on the number of downstream connected users associated with the nodes in each radio group.

9. The system of claim 1, wherein, upon addition of a new node to the plurality of nodes at a first time point, the automatic frequency planning module:
   assigns a first frequency channel using a naïve RF allocation algorithm, wherein the frequency channel is assigned based solely on the geographic position and heading of the antenna of the new node, and
   assigns a second frequency channel using the RF allocation algorithm at a time point subsequent to the first time point.

10. The system of claim 1, wherein the automatic frequency planning module executes the RF allocation algorithm immediately in response to a change in network traffic above a threshold value.

11. A method for allocating frequency channels across a radiofrequency (RF) mesh network, comprising:
   identifying pairs of radio groups having a propensity for interference from among a plurality of radio groups, wherein each radio group comprises at least two radios communicatively coupled by an associated wireless link, based on at least one of the geographic position, heading, and beam shape associated with each of the at least two radios of each radio group, and generating an interference propensity mapping based on the propensity for interference of each radio group with each other radio group;
   allocating frequency channels to each of the plurality of radio groups based on the interference propensity mapping;
   deploying the allocated frequency channels to the plurality of radio groups; and collecting interference metrics based on actual network traffic among the plurality of radio groups, updating the interference propensity mapping based on the collected interference metrics, and reallocating frequency channels in response to detecting an allocation trigger;

wherein generating the interference propensity mapping comprises generating a graph of radio groups connected by edges, wherein an edge connects a pair of radio groups based on the propensity for interference associated with the pair, and wherein allocating frequency channels to each of the plurality of radio groups comprises:

ordering the plurality of radio groups according to a number of edges connected to each radio group of the graph to generate an ordered list of radio groups; and sequentially assigning frequency channels to the ordered list of radio groups.

12. The method of claim 11, further comprising ordering radio groups having a same number of edges connected thereto based on a secondary metric.

13. The method of claim 12, wherein the secondary metric comprises a number of downstream users connected to the nodes of the radio group, and further comprising ordering radio groups having a higher number of downstream users ahead of radio groups having a lower number of downstream users.

14. The method of claim 11, wherein the edge connects a pair of radio groups based on the propensity for interference exceeding a threshold value.

15. The method of claim 11, wherein each edge is weighted in proportion to the propensity for interference, and further comprising ordering the plurality of radio groups according to a weighted sum of the number of edges connected to each radio group.

16. The method of claim 11, further comprising allocating frequency channels to each of the plurality of radio groups such that the broadcast headings of the antennas of the nodes in each radio group are within non-overlapping angular sectors.

17. The method of claim 11, further comprising allocating frequency channels to each of the plurality of radio groups based on the number of downstream connected users associated with the nodes in each radio group.

18. The method of claim 11, wherein the allocation trigger comprises a change in network traffic above a threshold value.

* * * * *